Figure 3:
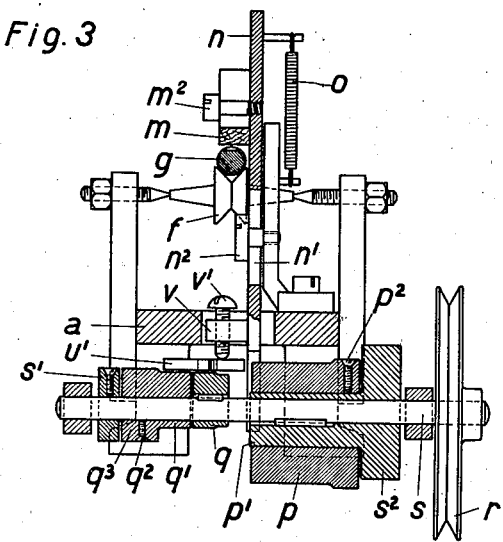

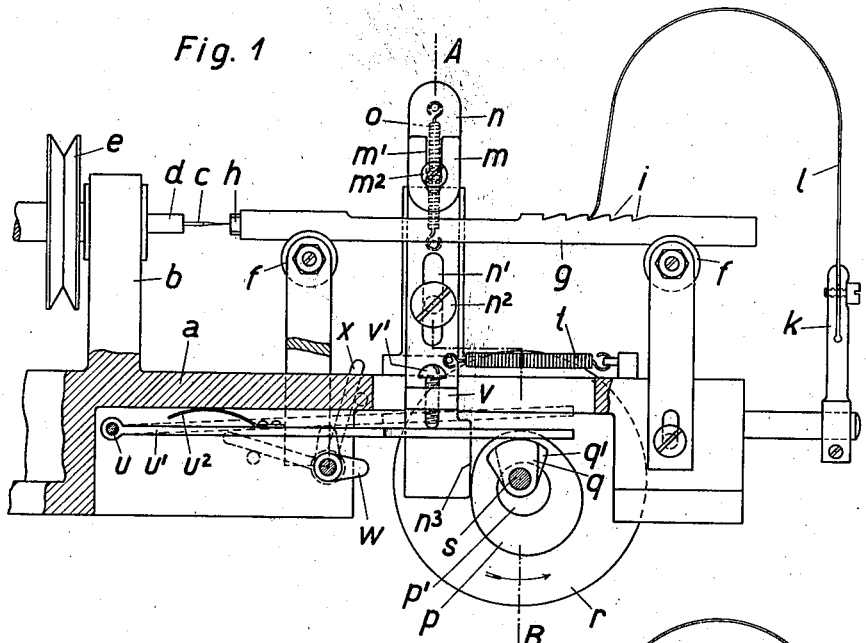
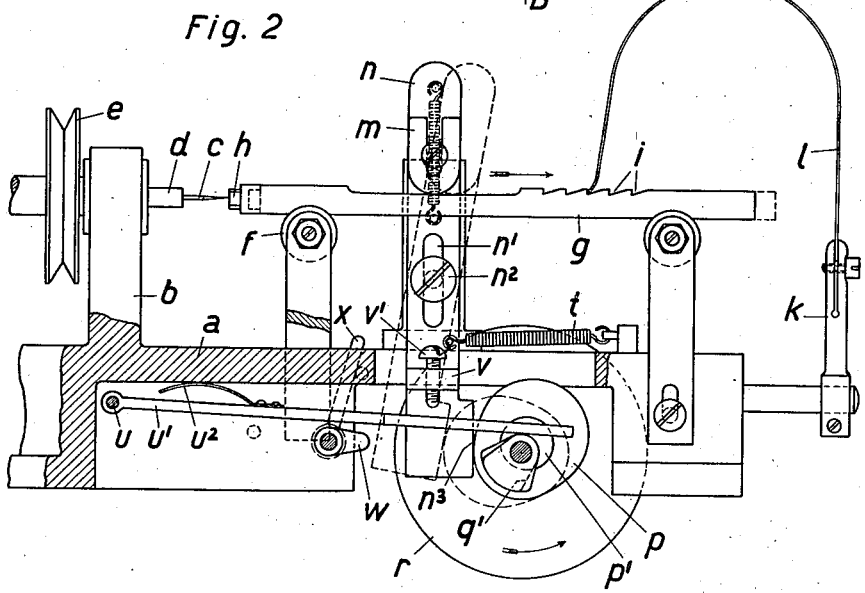

May 17, 1927. 1,629,220
S. LOEWENHERZ ET AL
MACHINE FOR DRILLING DRAWING DIES
Filed Sept. 2, 1925 2 Sheets-Sheet 2

Inventors:
Siegmund Loewenherz
Max Stockmayer
By [signature] Atty.

Patented May 17, 1927.

1,629,220

UNITED STATES PATENT OFFICE.

SIEGMUND LOEWENHERZ AND MAX STOCKMAYER, OF BERLIN, GERMANY, ASSIGNORS TO PATENT-TREUHAND-GESELLSCHAFT FÜR ELEKTRISCHE GLÜHLAMPEN M. B. H., OF EHRENBERGSTRASSE, BERLIN, GERMANY, A CORPORATION OF GERMANY.

MACHINE FOR DRILLING DRAWING DIES.

Application filed September 2, 1925. Serial No. 54,006.

The invention relates to machines for boring drawing discs or dies, in particular diamond dies, in which the reciprocating work holder is retracted mechanically at short intervals of time from the rotating drill and is pressed through the medium of springs again into contact with the drill. The withdrawal of the work holder is effected in hitherto known machines of this kind usually by means of a rocking lever controlled by a cam bearing against a pin or the like mounted on the work holder and through the medium of the pin or the like retracting the work holder against the action of the spring. As the drill is subjected to continuous wear and thereby becomes shortened it has hitherto been necessary in such machines at short intervals of time to alter the position of the lever acting on the pin attached to the work holder, so that both the necessary movement of the work holder and the correct time of contact between drill and work are maintained and the stone is not moved too far after a certain interval of time nor kept in contact with the drill.

The invention has for its object to relieve the attendant of the continuous inspection of the correct return movement of the work holder.

For this purpose in accordance with the invention the work holder is retracted in a novel manner solely by a friction or clamping action effected through the medium of a pin or the like adapted to press on the work holder and to reciprocate therewith. The latter in its return movement moves the work holder with it by friction or clamping effect independent of its axial position and releases it at the end of the return movement so that it may be pressed forward in known manner by spring action and then again returned into initial position. In this manner of retracting the work holder even when axial displacement of the same in relation to the clamping member has taken place due to wear of the tool carrier, on the return movement of the work holder it always moves the same amount since the pin or the like moving the work holder acts exactly the same whether it grips the work holder further forward or further rearwards in relation to the drill. Preferably a lever rocking about a fixed pivot and adapted to be displaced is employed for withdrawing the work holder which lever has a finger-like member adapted to bear on the work holder and receiving from a cam the necessary rocking movement and displacement or rise and falling movement. In order that the length of stroke may be varied in accordance with the fineness of the drill point and in order to be able to regulate at each stroke the relation of the time of contact of the die or stone with the drill to the time necessary for the withdrawing movement, the cams acting on the retracting lever are arranged as double cams on a common axis mounted in the machine frame.

Figure 4:
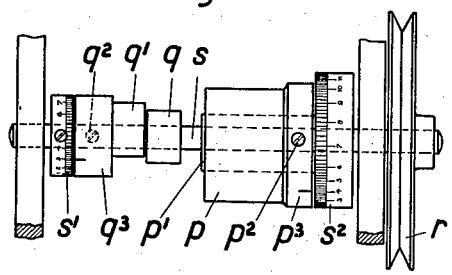

A machine in accordance with the invention is illustrated in the accompanying drawing in Figs. 1 and 2 in plan in different positions. Fig. 3, is a transverse section through the machine on the line A—B, and Fig. 4, a plan of the main or driving shaft.

Figure 5:
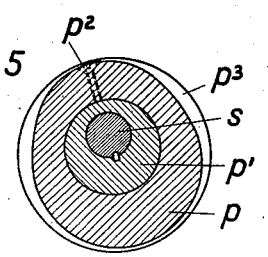
Figure 6:
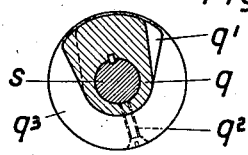

Figs. 5 and 6 show in section to enlarged scale the cams used.

As shown, on the machine frame $a$ is mounted in a bearing bracket $b$ a spindle $d$ carrying the drill $c$ which is set in rotation by a belt pulley $e$. Axially of the drill $c$ is mounted on adjustably mounted rollers $f$ a cylindrical rod $g$ to the forward left hand end of which the work or the stone to be drilled is soldered in the usual manner. The rod-like work holder $g$ is formed on its upper side with notches $i$, in which engages a blade spring $l$ secured to an adjustable holder $k$. By means of the blade spring $l$ the work holder, which is retracted mechanically at predetermined short intervals of time, is always again pressed forward towards the drill $c$. The work holder $g$ is retracted by a finger-like pressure member or a cam $m$ adapted to press on the work holder, which cam is mounted on the upper end of a lever $n$, which is under the action of a spring $o$ tending to press it and the cam $m$ against the work holder $g$. By means of a set screw $m^2$ extending through a slot $m'$ in the cam, the cam $m$ can be finely adjusted vertically and on any wear of its surface taking place can be re-adjusted. The upright lever $n$ which carries the cam is adapted to be rocked about a slot $m'$ on a fixed horizontal pivot $n^2$ and is adapted to be displaced in its longitudinal direction, so that the cam $m$ may be moved rectilinearly and pressed on and removed from the work holder $g$.

The rocking movement and the movement of displacement are imparted to the lever $n$ by cams $p$ and $q$. $q'$, the last two of which are secured to a shaft $s$ and the cam $p$ is mounted on an eccentric $p'$ on shaft $s$ which is rotated continuously from a belt pulley $r$. The one cam drive consists of a cam ring $p$, which is adjustable by rotation on the cam $p'$ keyed to the shaft $s$ and is adapted to be clamped by a screw $p^2$ at suitable relative positions. A projecton $n^3$ on the lever $n$ is pressed continuously against the periphery of the cam ring $p$ by a spring $t$, so that on each revolution of the double cam $p.\ p.'$ the lever $n$ is rocked to and fro about the pivot $n^2$. On two similar cam discs $q.\ q.'$ off-set in relation to one another, rests a single armed lever $u'$ adapted to rock about the pivot $u$, a spring $u^2$ pressing the lever into contact with both cams $q.\ q.'$. Above this lever $u'$ which on each rotation of the cam discs $q.\ q.'$ is raised and lowered once, an adjustable screw $v'$ is disposed in a lug V on the lever $n$.

The lever $u'$ on its upward movement strikes the adjusting screw $v'$, acting as a stop and thereby moves the lever $n$ against the action of the spring $o$ at the same time raising the cam $m$ out of contact with the work holder $g$. When the lever $u'$ falls, the lever $n$ falls by gravity, being however assisted in its downward movement by the spring $o$, until the cam $m$ again comes into contact with the work holder and is pressed against it by the action of the spring $o$.

When the machine is to be used the shaft $s$ is first preferably rotated by hand until the pair of eccentrics $p.\ p.'$ and $q.\ q.'$ and the lever $n$ assume the positions shown in Fig. 1. and the cam $m$ is out of contact with the work holder $g$. Then by inserting the blade spring $l$ in a notch in the work holder $g$, the stone or die is pressed against the drill $c$ and thereupon both the drill and the shaft $s$ are set in rotation.

After a part of a revolution of the shaft $s$ and of the cam discs $q.\ q.'$ secured thereto, the lever $u'$ moves downward and therewith the lever $n$ and the cam $m$ as shown in Fig. 2. The cam is thus pressed firmly by the spring $o$ against the work holder $g$. After a further portion of a revolution of the shaft $s$, the outer cam ring $p$ comes into action and presses the lower end $n^3$ of the lever $n$ to the left as shown dotted in Fig. 2., against the action of the spring $t$. The upper end of the lever $n$ rocking about a pivot $n^2$ thus moves to the right, the cam $m$ taking the work holder $g$ with it in the direction indicated by the arrow. As soon as this movement has occurred the two cam discs $q.\ q.'$ have already rotated so far by the rotation of the shaft $s$ that the single armed lever $u'$ is raised. This lever in its upward movement presses against the set screw $v'$ and raises also the lever $n$ against the action of the spring $o$. The cam $m$ is thereby moved out of contact with the work holder which then is moved towards the drill $c$ by the blade spring $l$ until the stone $h$ again bears on the drill. On further partial revolution of the shaft $s$ the cam $p$ again moves into position shown in Fig. 1. As the projection $n^3$ on the lever $n$ due to the action of the spring $t$ is continuously pressed into contact with the cam ring $p$ and thus is moved again towards the right, on this partial revolution of the shaft $s$ and of the cam $p$ the upper end of the lever $n$ with the cam $m$, moved away from the work holder, moves to the left and thus returns, without moving the work holder, into the initial position shown in Fig. 1., whereupon on the next rotation of the shaft $s$ the upward and downward movement described and the rocking movement of the lever $n$ are again repeated. The cam $m$ thus continuously moves and takes the work holder $g$ with it through the same distance whether or not due to wear of the drill its axial position in relation to the cam has altered. Only the zone of movement is displaced.

Of the two cam discs $q.\ q.'$ acting on the single armed lever the one $q$ is preferably keyed to the shaft $s$ while the other $q'$ is rotatably adjustable by means of the screw $q^2$. According to the relative position of these cam discs $q.\ q.'$ the one-armed lever $u'$ bears against different cam portions of the cam discs $q.\ q.'$ for a longer or shorter period. The time during which the cam $m$ is raised clear of the work holder and the time during which it remains in contact therewith and the time during which the stone and drill are in contact can thus be adjusted within wide limits. To facilitate this adjustment a mark is provided on an annular extension $q^3$ of the cam disc $q'$ which can be moved in relation to a scale provided on the fixed collar $s'$ on the shaft $s$. In similar manner the cam ring $p$ rotatable on the fixed cam $p'$ and adapted to be clamped by means of a screw $p^2$ has an annular extension $p^3$ provided with a mark which is adjustable in relation to a scale provided on the fixed collar $s^2$. The collar $s^2$ may, as shown, be in one with the fixed inner cam but may be separately mounted on the shaft $s$. According to the adjustment effected by rotation of the cam $p$ on the fixed cam $p'$ a smaller or larger total eccentricity of the double cam and rocking movement of the lever $n$ and thus a smaller or larger stroke of the work holder $g$ can be obtained. Movement of the work holder can thus be adjusted to any fineness of the drill point.

If the work holder is to be moved out of action, for example, in order to allow of sharpening or exchanging the drill the one-armed lever $u'$ is raised by rotation of a lever $x$ provided on the cam $w$ into the position shown dotted in Fig. 1. in which this lever and also the lever $n$ with the cam $m$ thereby raised are no longer operable by the cam discs $q$. $q'$. The cam $m$ adapted to press on the work holder $g$ and displacing the latter by friction or clamping action does not necessarily require to press from above on the work holder $g$. It may quite as well press from one side or from beneath against the work holder. It may, moreover, have various shapes and various kinds of movement.

By taking the movement of the cam $m$ from cams which are mounted on a shaft itself mounted in the machine, a very simple construction is obtained—a very particular advantage of the new machine. By dispensing with the gearing otherwise located externally of the machine for moving the work holder, moreover, the inspection of the machine is simplified.

We claim:

1. A machine for drilling drawing dies, in particular diamond dies, including a drill, a work holder adapted to be reciprocated in relation to the drill, and means for moving the work holder through the same distance independently of its position during the drilling operation, said means including a pressure applying member adapted to press on and displace said work holder.

2. A machine for boring drawing dies in particular diamond dies, including a drill, a work holder adapted to be reciprocated in relation to the drill and means for moving the work holder independently of its position and zone of movement, said means including a rocking lever and a pressure applying member adjustably secured to said rocking lever and adapted to be displaced with said lever and to press on and displace the work holder.

3. A machine for drilling drawing dies, in particular diamond dies, including a drill, a work holder adapted to be reciprocated in relation to the drill, means for moving the work holder through a definite distance independently of its position, said means including a rocking lever and a pressure applying member adapted to be displaced with said lever and to press on and displace the work holder, and cams actuating said pressure applying member and said rocking lever.

4. A machine for drilling drawing dies, in particular diamond dies, including a drill, a work holder adapted to be reciprocated in relation to the drill and means for moving the work holder independently of its position, said means including a rocking lever and a pressure applying member adapted to be displaced with said lever and to press on and displace the work holder, and cams actuating said pressure member and said rocking lever, said cams adapted to be displaced in relation to each other, substantially as and for the purpose set forth.

5. A machine for drilling drawing dies, in particular diamond dies, including a drill, a work holder adapted to be reciprocated in relation to the drill, and means for moving the work holder through a definite distance independently of its position, said means including a rocking lever and a pressure applying member adapted to be displaced with said lever and to press on and displace said work holder, a driving shaft and cams controlling said pressure member and said rocking lever, said cams movably mounted on said driving shaft.

6. A machine for drilling drawing dies, in particular diamond dies, including a drill, a work holder adapted to be reciprocated in relation to the drill, and means for moving the work holder through a definite distance independently of its position, said means including a rocking lever and a pressure applying member adapted to be displaced with said lever and to press on and displace the work holder, a driving shaft and cams controlling said pressure member and said rocking lever.

7. A machine for drilling drawing dies, in particular diamond dies, including a drill, a work holder adapted to be reciprocated in relation to the drill and means for moving the work holder through a definite distance independently of its position said means including a rocking lever and a pressure applying member adapted to be displaced with said lever and to press on the work holder, a driving shaft and cams controlling said pressure member and said rocking lever, said cams movably mounted on said driving shaft and means for rendering said cams ineffective on said rocking lever and pressure member.

8. A machine for drilling drawing dies particularly diamond dies, comprising a drill, a spring-urged work holder reciprocable with respect thereto and means frictionally engaging the work holder to retract the work holder against its spring action from the drill a definite amount independent of the fed position of the holder during the drilling and the depth of hole.

9. A machine for drilling drawing dies particularly diamond dies, comprising a drill, a spring-urged work holder reciprocable with respect thereto, means to frictionally grip said holder after each feed movement and means to actuate the gripping means in substantially rectangular directions.

10. A machine for drilling drawing dies particularly diamond dies, comprising a drill, an alined spring-urged work holder therefor, pivoted retracting means engaging the holder and means to cause the pivoted means to move on its pivot with its point of engagement with the holder moving in a straight line the same distance independent of the fed position of the holder.

11. A machine for drilling dies particularly diamond dies, comprising a drill, an alined, spring-urged work holder therefor, a pivoted lever to retract the holder a definite distance, and cams controlling the movement of said lever, the cams of a pair being relatively adjustable to vary their timing.

12. A machine for drilling dies, particularly diamond dies comprising a drill, an alined spring-urged work holder therefor, a pivoted spring-urged lever, a spring-urged gripping member on said lever to engage the holder, a micrometically adjustable cam eccentrically mounted to swing the lever on its pivot during the retracting motion of the gripping member, and a pair of micrometically and relatively adjustable cams to lift the lever to disengage said device and permit the holder to feed.

In testimony that we claim the foregoing as our invention, we have signed our names.

SIEGMUND LOEWENHERZ.
MAX STOCKMAYER.